(12) United States Patent
Huang et al.

(10) Patent No.: US 7,985,786 B2
(45) Date of Patent: Jul. 26, 2011

(54) RUBBER-MODIFIED CEMENTITIOUS SUBSTANCE AND METHOD OF MAKING THE SAME

(75) Inventors: Baoshan Huang, Knoxville, TN (US); Jingyao Cao, Santa Clara, CA (US); Xiang Shu, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 182 days.

(21) Appl. No.: 12/257,898

(22) Filed: Oct. 24, 2008

(65) Prior Publication Data

US 2009/0111911 A1    Apr. 30, 2009

Related U.S. Application Data

(60) Provisional application No. 60/982,933, filed on Oct. 26, 2007.

(51) Int. Cl.
*C08K 9/02* (2006.01)
(52) U.S. Cl. ................. 523/204; 524/2; 524/8
(58) Field of Classification Search ............ 523/204; 524/2, 8
See application file for complete search history.

(56) References Cited

U.S. PATENT DOCUMENTS 4,035,192 A * 7/1977 Busacca .................. 523/204

OTHER PUBLICATIONS

Huang, B., G. Li, S.-S. Pang, and J. Eggers (2004). "Investigation into waste tire rubber-filled concrete," Journal of Materials in Civil Engineering, 16(3), 187-194.
Li, G., G. Garrick, J. Eggers, C. Abadie, M. A. Stubblefield, and S.-S. Pang (2004). "Waste tire fiber modified concrete," Composites: Part B, 35, 305-312.
Li, G., M. A. Stubblefield, G. Garrick, J. Eggers, C. Abadie, and B. Huang (2004). "Development of waste tire modified concrete," Cement and Concrete Research, 34, 2283-2289.
Siddique, R. and T. R. Naik (2004). "Properties of contrete containing scrap-tire rubber—an overview," Waste Management, 24, 563-569.
Topcu, I. B. (1995). "The properties of rubberized concretes," Cement and Concrete Research, 25(2), 304-310.

* cited by examiner

*Primary Examiner* — Edward J Cain
(74) *Attorney, Agent, or Firm* — Pitts, Lake & Bell, P.C.

(57) ABSTRACT

Rubber-modified cementitious substances and various methods of making such substances or components thereof. One embodiment of the substance includes a mix of cement and composite particles, wherein essentially each of the composite particles has a rubber core enclosed in an inorganic exterior and wherein the rubber core is chemically coupled to the inorganic exterior. The chemical coupling between the rubber core and the inorganic exterior and the bonding between the inorganic exterior and the cement result in a rubber-modified cementitious substance that has greater strength than comparable conventional rubber-modified cementitious substances. One embodiment of the method of making a rubber-modified cementitious substance includes (1) reacting a coupling agent with rubber particles and inorganic particles to yield composite particles, wherein essentially each of the composite particles has a rubber core enclosed in an inorganic exterior and (2) combining the composite particles with a cementitious substance to yield a rubber-modified cementitious substance.

47 Claims, 4 Drawing Sheets

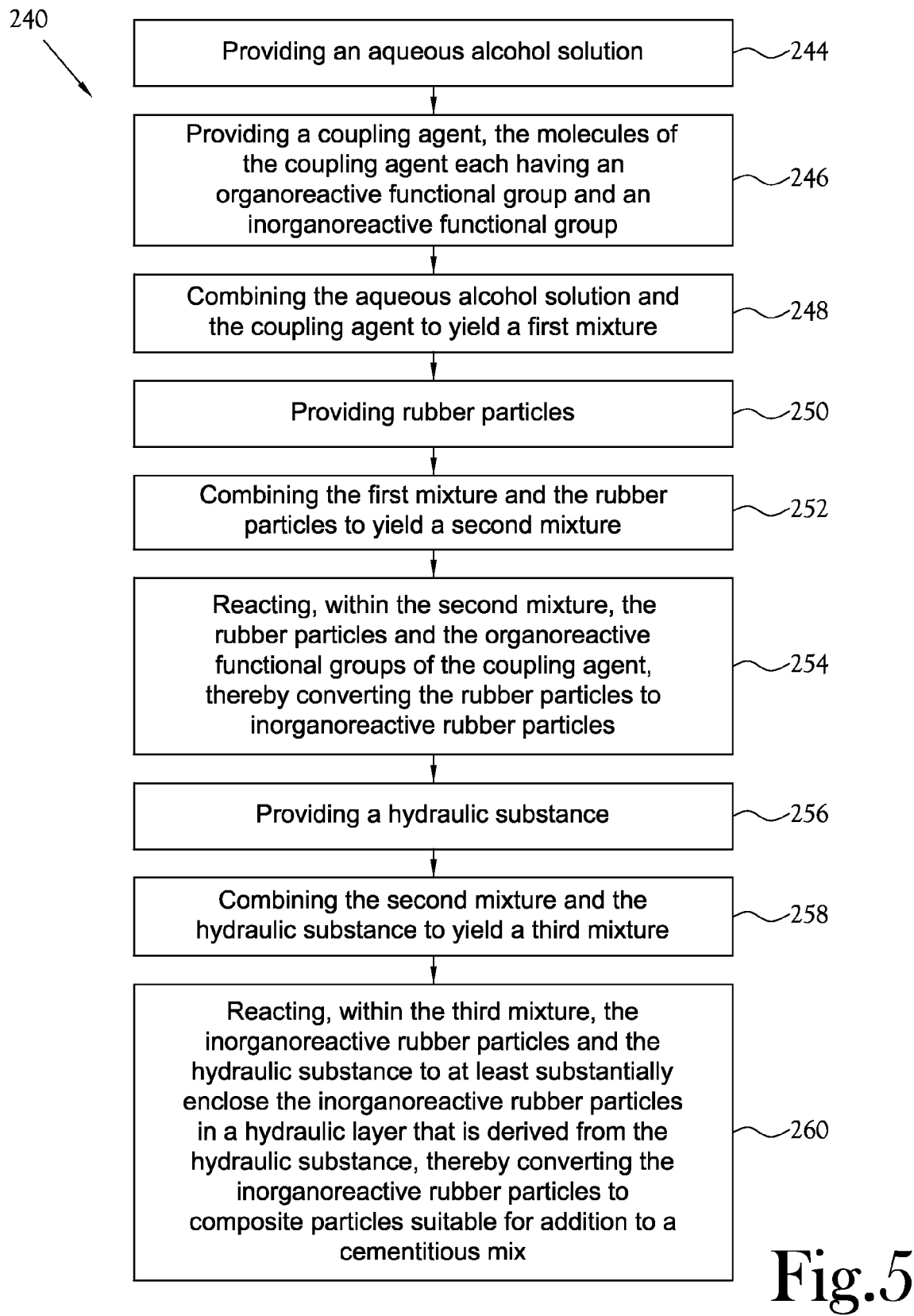

RUBBER-MODIFIED CEMENTITIOUS SUBSTANCE AND METHOD OF MAKING THE SAME

CROSS-REFERENCE TO RELATED APPLICATIONS

This Application claims priority from U.S. Provisional Patent Application No. 60/982,933, filed Oct. 26, 2007.

STATEMENT REGARDING FEDERALLY-SPONSORED RESEARCH OR DEVELOPMENT

Not Applicable

BACKGROUND OF THE INVENTION

1. Field of Invention

The invention relates to the field of rubber-modified cementitious substances. Additionally, some embodiments of the invention relate to the field of modifying cementitious substances using rubber from discarded tires.

2. Description of the Related Art

In the United States, more than 200 million used tires are discarded per year. Currently, approximately 11% of these discarded tires are recycled into civil engineering applications, including rubber-modified concrete ("RMC"). However, RMC is not suitable for many applications because it typically is significantly weaker than a comparable conventional concrete (i.e., concrete that is not rubber-modified). Accordingly, rubber-modified concrete generally is used only in secondary or non-critical structures, such as residential driveways, garages floors, trench bedding, and the like. Researchers have hypothesized that RMC is weaker because rubber particles (e.g., ground tire rubber) bond poorly to cement hydration products. Along this vein, several solutions have been proposed. By way of examples, in one study, researchers treated the rubber particles with sodium hydroxide before incorporating them into Portland cement concrete (PCC). In another study, researchers treated the rubber particles with nitric acid and cellulose ether before incorporating them into PCC. In still another study, the surfaces of the rubber particles were etched (to increase surface area) and then incorporated into concrete. While some success has been reported in increasing the strength of RMC, it has not been enough to significantly expand the range of applications for which RMC is suitable.

BRIEF SUMMARY OF THE INVENTION

Disclosed herein are various rubber-modified cementitious substances and various methods of making such substances or components thereof. One embodiment of the substance of the present invention includes a mix of cement and composite particles, wherein essentially each of the composite particles has a rubber core enclosed in an inorganic exterior and wherein the inorganic exterior is chemically coupled to the rubber core. The inorganic exterior is capable of bonding relatively strongly to the cement hydration products, in comparison to any bonding that, in its absence, would have otherwise occurred between the rubber and the cement hydration products. Accordingly, (1) the chemical coupling between the rubber core and the inorganic exterior and (2) the bonding between the inorganic exterior and the cement hydration products result in an embodiment that has greater strength than comparable conventional rubber-modified cementitious substances and, accordingly, is suitable for a broader range of applications. Other embodiments of the substance of the present invention are disclosed later in this specification.

One embodiment of the method of making the rubber-modified cementitious substance requires that the following be provided: rubber particles, inorganic particles, a coupling agent, and a cementitious substance. The coupling agent is reacted with the rubber particles and the inorganic particles to yield composite particles, each of which has a rubber core enclosed in an inorganic exterior. The rubber core is derived from approximately one of the rubber particles, whereas the inorganic exterior is derived from some of the inorganic particles. As a consequence of the reacting step, the rubber core is chemically coupled to the inorganic exterior. Thereafter, the composite particles and the cementitious substance are combined to yield the rubber-modified cementitious mix. Other embodiments of the method of making the rubber-modified cementitious substance are disclosed later in this specification.

BRIEF DESCRIPTION OF THE SEVERAL VIEWS OF THE DRAWINGS

The above-mentioned features of the invention will become more clearly understood from the following detailed description of the invention read together with the drawings in which:

FIG. 5 is a flowchart that shows an embodiment of the method for making composite particles suitable for addition to a cementitious mix.

DETAILED DESCRIPTION OF THE INVENTION

Figure 1:
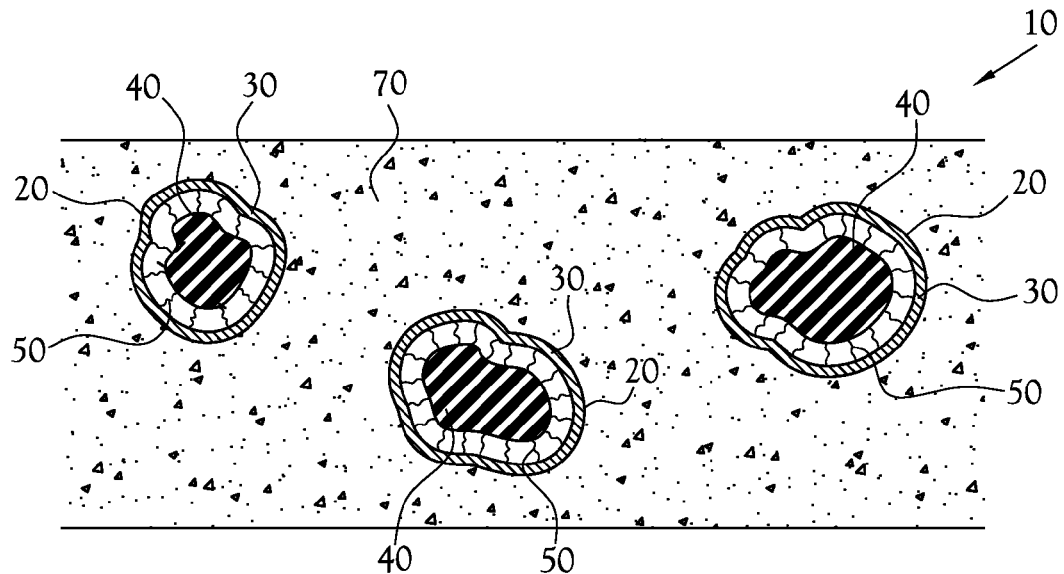
FIG. 1 is a schematic partial section view of an embodiment of the rubber-modified cementitious substance of the present invention.

The present invention, i.e., a rubber-modified cementitious substance and method for making the same, is described more fully hereinafter. From the outset, it is worth noting that this invention may be embodied in many different forms and should not be construed as limited to the specific embodiments described herein.

DEFINITIONS

"Admixture" is a material (other than aggregate, cement, or water) added in small quantities to concrete to produce some desired change in properties.

"Bond" is a chemical linking between two atoms or groups of atoms such that the forces acting between them lead to the formation of an aggregate with sufficient stability to make it convenient for the chemist to consider it as an independent molecular species.

"Cement" is a dry powder—made from at least one or more of the following: silica, alumina, lime, iron oxide, and magnesium oxide—that hardens when mixed with water; used as an ingredient in concrete.

"Cementitious" means like or relevant to or having the properties of cement (e.g., having cement-like properties).

"Concrete" is a hard strong building material made by mixing a cementing material (as portland cement) and a mineral aggregate (as sand and gravel) with sufficient water to cause the cement to set and bind the entire mass.

"Coupling agent" is a substance that can react with at least two components of a composite material to form a binding link at their interface.

"Hydraulic" means hardening or setting under water.

"Inorganic" means pertaining to or composed of chemical compounds that do not contain carbon as the principal element (excepting carbonates, cyanides, and cyanates).

"Inorganoreactive" describes a compound or functional group on a molecule that shows affinity for reacting chemically with inorganic substances.

"Organoreactive" describes a compound or functional group on a molecule that shows affinity for reacting chemically with organic substances.

"Portland cement" is a hydraulic cement made by finely pulverizing the clinker produced by calcining to incipient fusion a mixture of clay and limestone or similar materials.

"Rubber" includes any of the following: (1) an elastic substance, essentially a polymer of isoprene, that is obtained by coagulating the milky juice of any of various tropical plants (as of the genera *Hevea* and/or *Ficus*), and that can be prepared as sheets and then dried; or (2) any of various synthetic rubberlike substances; or (3) a natural or synthetic rubber modified by chemical treatment to increase its useful properties (as toughness and resistance to wear) and used especially in tires, electrical insulation, and waterproof materials.

"Silane" includes any of various compounds of hydrogen and silicon that have the general formula $Si_nH_{2n}+2$ and are analogous to alkanes. Additionally, the term silane is extended to include compounds in which any or all of the hydrogen atoms have been replaced by other atoms or groups of atoms, as in tetrachlorosilane, $SiCl_4$.

"Vulcanization" is the process of treating crude or synthetic rubber or similar plastic material chemically to give it useful properties (as elasticity, strength, and stability).

A Rubber-Modified Cementitious Substance and Method of Making the Same

Disclosed herein is a rubber-modified cementitious substance that, through the use of chemically active additives, shows superior compressive strength when compared with other cementitious substances containing similar percent-by-mass rubber content. A method for making this improved rubber-modified cementitious substance is also disclosed. Generally, to improve the integration of a rubber particle into the cementitious mixture, the rubber particle is subjected to a surface treatment method involving two broad steps. First, the rubber particle is treated with a coupling agent, generally a silane coupling agent having a hydrophobic end and a hydrophilic end connected by a chain of atoms (often including a sulfide chain, an alkane chain, or both). The hydrophobic end of the silane coupling agent bonds with the epoxy end of the rubber particle. Multiple molecules of the coupling agent form a self-assembled monolayer surrounding the rubber particle, with the hydrophilic ends of the coupling agent molecules facing outward from the complex. Then, the hydrophilic ends of the coupling agent molecules react with an inorganic coating agent (generally cement particles or a mixture of cement particles and silica fume). The rubber particle, coupling agent and inorganic coating agent thereby form a composite particle suitable for integration with other cementituous materials to form a rubber-modified cementitious substance. The chemical bonds formed through the coupling agent link the rubber particles more extensively with the inorganic substance and result in a decreased void content in the resulting rubber-modified cementitious substance. Hence, the rubber-modified cementitious substance containing rubber treated in the disclosed manner shows a slightly higher density and a substantially higher compressive strength when compared with a cementitious substance with the same percent-by-mass rubber content where the rubber has not been treated in the disclosed manner.

FIG. 1 is a schematic partial section view of an embodiment 10 of the rubber-modified cementitious substance of the present invention. As shown in FIG. 1, embodiment 10 includes composite particles 20 (section view) enclosed in a cementitious substance 70. In embodiment 10 and other embodiments of the rubber-modified cementitious substance, the cementitious substance 70 is a hydraulic structural or hydraulic infrastructural material. Portland cement concrete, for example, serves as the cementitious substance 70 in some embodiments. The composite particles 20 each have an inorganic exterior 30 and a core 40. In embodiment 10 and all other embodiments of the rubber-modified cementitious substance, the inorganic exterior 30 comprises an inorganic coating substance, whereas the core 40 of each of the composite particles 20 comprises rubber, an organic substance. In various embodiments, the inorganic exterior 30 includes, for example, silica fume or other pozzolanic substance, a hydraulic substance such as cement, or any combination thereof. In instances where the inorganic exterior 30 includes a hydraulic substance, the inorganic exterior 30 can be hydrated to form a hard shell. The core 40, in turn, in some embodiments is composed of waste rubber, such as rubber derived from discarded tires. Of course, it will be understood by those skilled in the art that the core 40 could be composed of new rubber, rather than recycled rubber, or rubber that has been reclaimed from a source other than discarded tires. The inorganic exterior 30 and the core 40 are connected by binding links 50 that resulted, at least in part, from a chemical reaction, wherein at least one of the reagents was a coupling agent. The binding links 50 are provided because, in their absence, stable bonds would not form between the exterior surface of the core 40 (which is relatively hydrophobic) and the interior surface of the inorganic exterior 30 (which is relatively hydrophilic). Accordingly, the compressive strength of a rubber-modified cementitious substance having the binding links 50 in many cases will be significantly greater than that of a comparable substance not having the binding links 50.

The nature of the binding links 50 varies depending on, among other factors, the type of rubber used in the core 40 and the composition of the inorganic exterior 30. For example, where the core 40 includes rubber that was vulcanized using sulfur and the inorganic exterior 30 includes silica fume, cement, or other substance containing silicon and/or aluminum, then a sulfidosilane may be used as the coupling agent. Bis-triethoxysilylpropyldisulfidosilane ("TESPD") (i.e., $(CH_3CH_2O)_3SiCH_2CH_2CH_2S_2CH_2CH_2CH_2Si(OCH_2CH_3)_3$) and bis-triethoxysilylpropyltetrasulfidosilane ("TESPT") (i.e., $(CH_3CH_2O)_3SiCH_2CH_2CH_2S_4CH_2CH_2CH_2Si(OCH_2CH_3)_3$) each are particularly effective under these circumstances. Both of these silanes include a polysulfido organic group that can covalently bond with the sulfur vulcanization of the core. Such bonds are relatively stable and, as such, are among the factors that would tend to increase the compressive strength of a rubber-modified cementitious substance. Tires are commonly composed of rubber that has been vulcanized using a sulfur-based protocol. Accordingly, in at least this instance, the core 40 could be composed of rubber derived from such tires. This can be advantageous in that discarded tires are so plentiful that they present significant challenges in the field of waste management. Additionally, silane coupling agents having three or more hydrolyzable groups (e.g., methoxy, ethoxy) bond very strongly to inorganic substrates that include aluminum and/or silicon. Thus, TESPD and TESPT, which each include two triethoxy groups, are especially suited for bonding strongly to the inorganic exterior 30 (as defined in this paragraph) and to the core 40 (as defined in this paragraph) simultaneously, thereby resulting in the binding links 50. It will now be evident to one of ordinary skill in the art that many coupling agents having the formula $(RO)_3Si(CH_2)_3—S_x—(CH_2)_3Si(RO)_3$, wherein RO is a hydrolyzable group and x designates the number of sulfur atoms forming a chain in the middle of the molecule. In one embodiment of the invention, x is a range between 2 and 4. In another embodiment of the invention, x is a range between 2 and 6. In another embodiment of the invention, x is a range between 2 and 8. In still another embodiment of the invention, x is a range between 2 and 10.

Various features may be incorporated into embodiment 10 to enhance further its performance relative to conventional rubber-modified cementitious substances. Because the rubber used in modifying cementitious substances typically has a Young's modulus (E) that is significantly lower than the Young's modulus (E) of the cementitious substance 70 (itself), rubber-modified cementitious substances generally do not perform as well (in terms of compressive strength and other measures of performance known in the art) relative to comparable cementitious substances that are not rubber-modified. The rubber particles in rubber-modified cementitious substances are somewhat analogous to the air bubbles that are present in air-entrained concrete and, accordingly, negatively influence the compressive strength of the material, among other performance measures. This problem can be mitigated by appropriately limiting the diameter of the rubber particles to reduce the concentration of stress within the rubber-modified cementitious substance when such substance is under loading conditions. In embodiment 10, for example, the core 40 of each of the composite particles 20 can optionally have a diameter that is less than, or equal to, approximately five (5) millimeters. This feature will serve to mitigate, among other things, the stiffness incompatibility that usually exists between the composite particles 20 and the cementitious substance 70. Another feature can also aid in improving the performance of rubber-modified cementitious substances: specifically, in those instances where the inorganic exterior 30 of the composite particle 20 includes a hydraulic substance, the inorganic exterior 30 can be hydrated to yield a shell that encloses the core 40. The stiffness of the shell at least partially compensates for the presence of the core 40 (which comprises rubber), thereby improving the performance of the rubber-modified cementitious substance.

Figure 2:
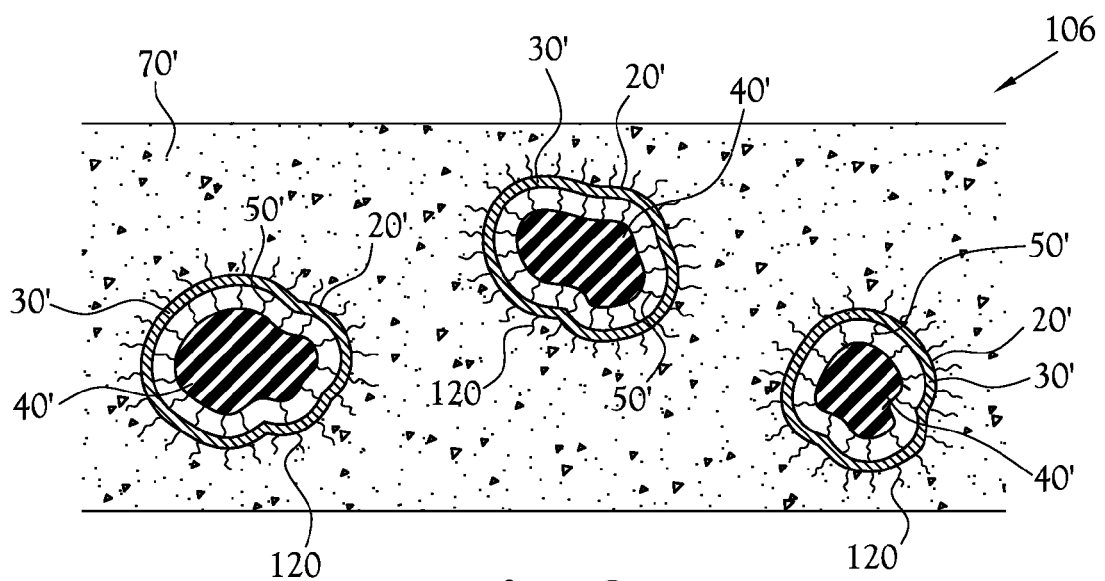
FIG. 2 is a schematic partial section view of another embodiment of the rubber-modified cementitious substance of the present invention.

FIG. 2 is a schematic partial section view of another embodiment 106 of the rubber-modified cementitious substance of the present invention. As shown in FIG. 2, embodiment 106 includes composite particles 20' (section view) enclosed in a cementitious substance 70'. As in embodiment 10, the composite particles 20' each have an inorganic exterior 30' and a core 40'. First binding links 50' connect the inorganic exterior 30' to the core 40'. A feature that distinguishes embodiment 106 from embodiment 10 is the presence of second binding links 120 that connect the inorganic exterior 30' to the cementitious substance 70'. The second binding links 120 result, at least in part, from a chemical reaction, wherein one of the reagents is a coupling agent ("second coupling agent"). As can be expected, the nature of the second binding links 120 varies depending on, among other factors, the composition of the inorganic exterior 30' and the composition of the cementitious substance 70'. For example, where the inorganic exterior 30' includes silica fume, cement, or another substance containing silicon or aluminum or both, or some combination of the foregoing; and the cementitious substance 70' is comprised primarily of Portland cement; then a 1:1 (by weight) mixture of aminoethylaminopropyltrimethoxysilane (i.e., $H_2NC_2H_4NHC_3H_6—Si(OCH_3)_3$) and glycidoxypropyltrimethoxysilane (i.e., $CH_2(O)CHCH_2OC_3H_6—Si(OCH_3)_3$) can serve as the second coupling agent. The amino group in the former acts as a nucleophile in attacking the oxirane ring in the latter, bonding the former to the latter to yield a second coupling agent that has two trimethylsiloxy ends. Water hydrolyzes the trimethylsiloxy ends to yield silanol ends, which then coordinate respectively with the metal (e.g., silicon, aluminum) hydroxyl groups present in the inorganic exterior 30' and in the cementitious substance 70'. Accordingly, an oxane bond is formed between a silanol end and the inorganic exterior 30', and another oxane bond is formed between the other silanol end and the cementitious substance 70', thereby coupling the composite particle 20' to the cementitious substance 70' to yield the second binding links 120. These links 120 further secure the composite particles 20' within the cementitious substance 70', thereby improving performance.

Additional features can be incorporated into embodiment 106 to improve performance further. As in embodiment 10, the core 40' of each of the composite particles 20' can optionally have a diameter that is less than, or equal to, approximately five (5) millimeters. Similarly, in those instances where the inorganic exterior 30' of the composite particle 20' includes a hydraulic substance, the inorganic exterior 30' can be hydrated to yield a shell that encloses the core 40'.

Figure 3:
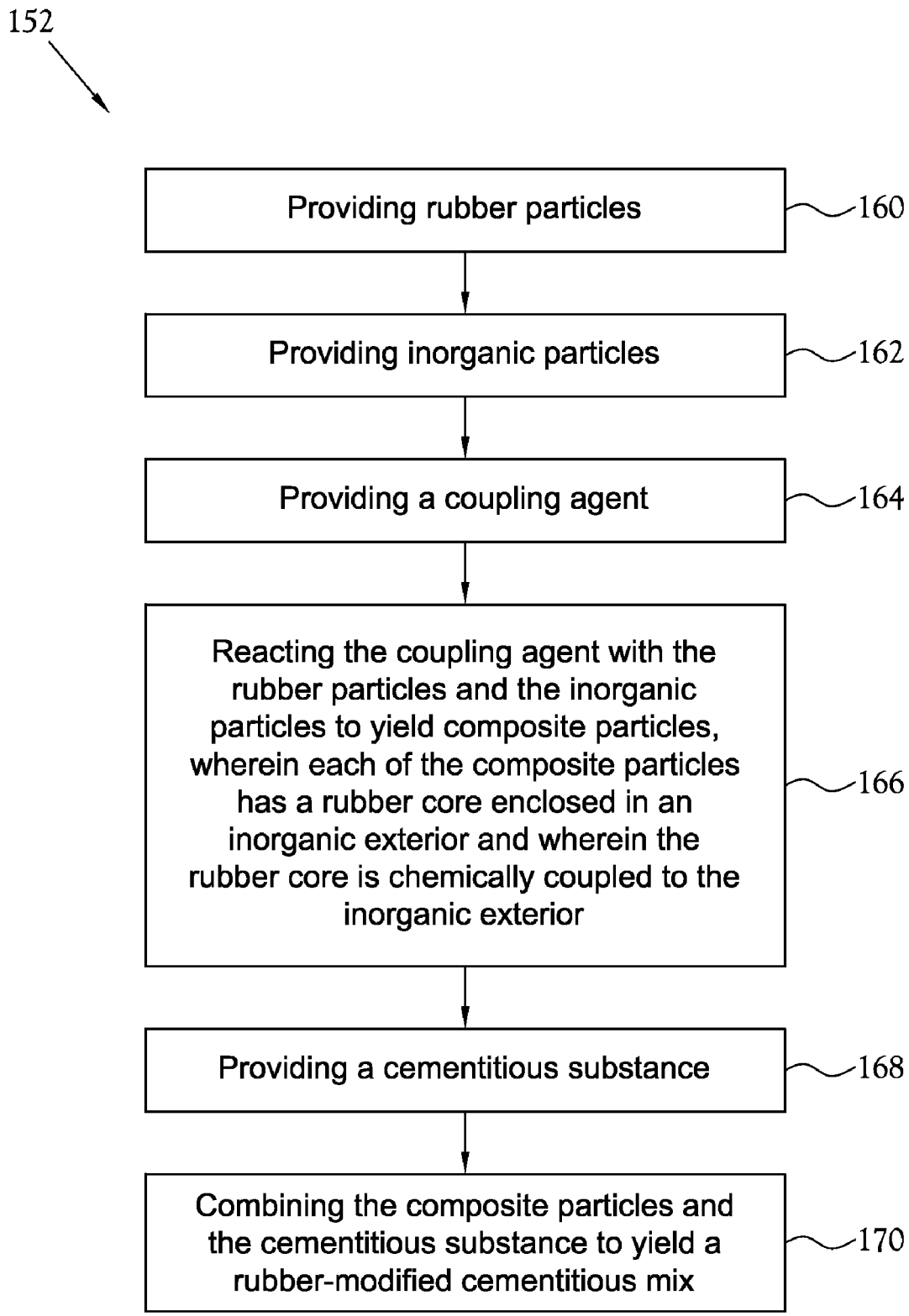
FIG. 3 is a flowchart that shows an embodiment of the method for making a rubber-modified cementitious mix.

FIG. 3 is a flowchart that shows an embodiment 152 of the method for making a rubber-modified cementitious mix. In accordance with the method of embodiment 152, rubber particles, inorganic particles, and a coupling agent are provided, as shown in FIG. 3 at steps 160, 162, and 164, respectively. Next, as indicated by step 166, the coupling agent is reacted with the rubber particles and the inorganic particles to yield composite particles, each of which has a rubber core enclosed in an inorganic exterior. The rubber core is derived from approximately one of the rubber particles, and the inorganic exterior is derived from some of the inorganic particles. As a consequence of the reacting step, the rubber core is chemically coupled to the inorganic exterior. As shown at step 168, a cementitious substance is provided. Thereafter, as represented by step 170, the composite particles and the cementitious substance are combined to yield the rubber-modified cementitious mix.

Figure 4:
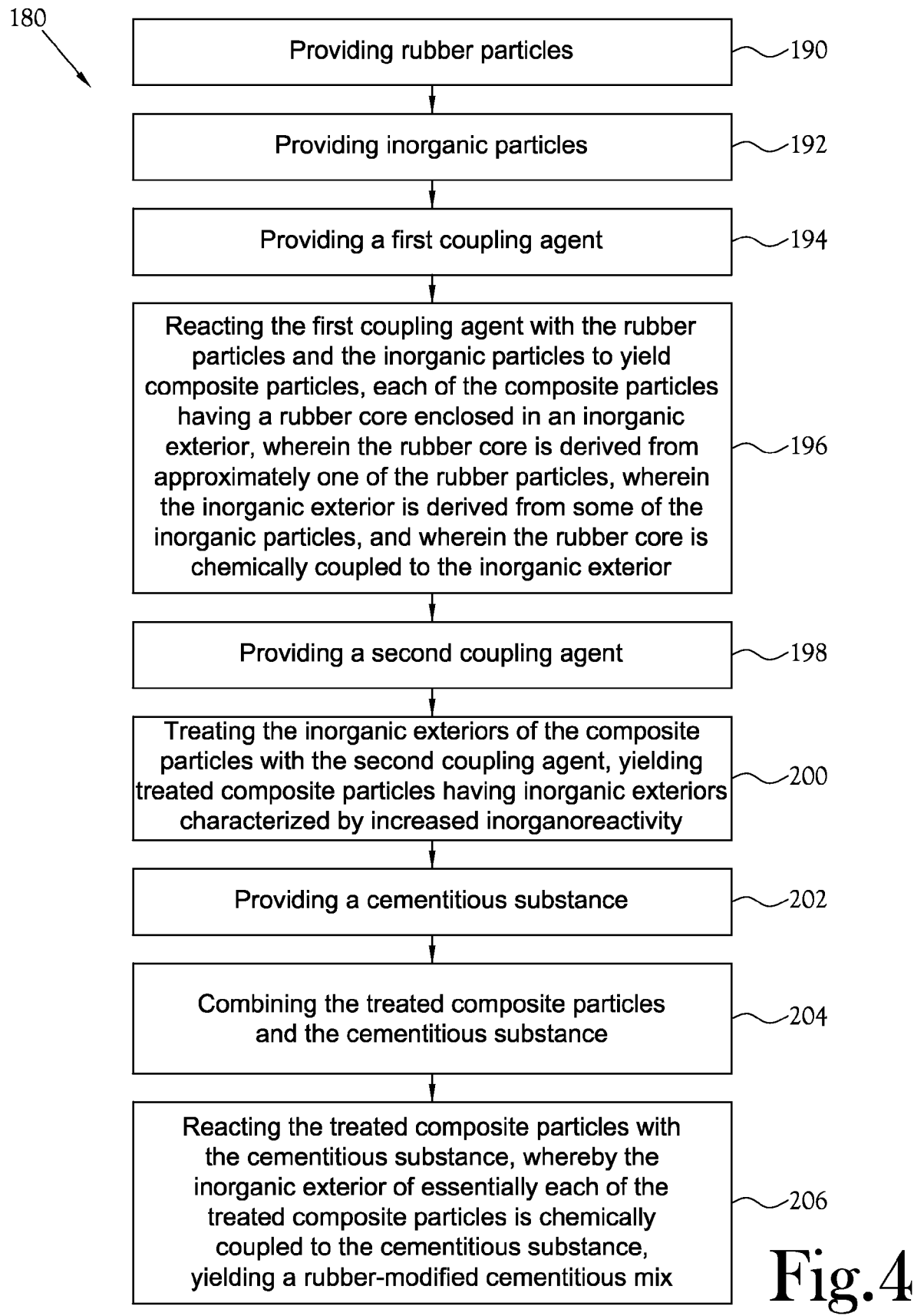
FIG. 4 is a flowchart that shows another embodiment of the method for making a rubber-modified cementitious mix.

FIG. 4 is a flowchart that shows another embodiment 180 of the method for making a rubber-modified cementitious mix. In accordance with the method of embodiment 180 (and similar to embodiment 152), rubber particles, inorganic particles, and a first coupling agent are provided, as indicated in FIG. 4 at steps 190, 192, and 194, respectively. Next, as in embodiment 152 and as indicated in FIG. 4 at step 196, the first coupling agent is reacted with the rubber particles and the inorganic particles to yield composite particles, each of which has a rubber core enclosed in an inorganic exterior. The rubber core is derived from approximately one of the rubber particles, whereas the inorganic exterior is derived from some of the inorganic particles. As a consequence of the reacting step, the rubber core is chemically coupled to the inorganic exterior. Next, as indicated in FIG. 4 at step 198, a second coupling agent is provided. Thereafter, as indicated at step 200, the inorganic exteriors of the composite particles are treated with the second coupling agent to yield treated composite particles having inorganic exteriors characterized by increased inorganoreactivity. As indicated at step 202, a cementitious substance is provided. Thereafter, as represented by step 204, the treated composite particles and the cementitious substance are combined. At step 206, the cementitious substance is reacted with the treated composite particles, whereby the inorganic exterior of essentially each of the treated composite particles is chemically coupled to the cementitious substance, yielding the rubber-modified cementitious mix.

FIG. 5 is a flowchart that shows an embodiment 240 of a method for making the composite particles that are identical to, or similar to, those in embodiment 10 of the rubber-modified cementitious substance. As indicated at step 244, an aqueous ethanol solution is provided. As indicated at step 246, a coupling agent is provided, the molecules of which each have both an organoreactive functional group and an inorganoreactive functional group. The couple agent can include one or more organofunctional silanes, which are silicon chemicals that contain both organic and inorganic reactivity in the same molecule. A typical general structure for an organofunctional silane is $(RO)_3SiCH_2CH_2CH_2$—X, where RO is a hydrolyzable group (e.g., methoxy, ethoxy) and X is an organofunctional group (e.g., amino, epoxy). For example, a 1:1 (by weight) mixture of aminoethylaminopropyltrimethoxysilane (i.e., $H_2NCH_2CH_2NHCH_2CH_2CH_2Si(OCH_3)_3$) and glycidoxypropyltrimethoxysilane (i.e., $CH_2(O)CHCH_2OCH_2CH_2CH_2Si(OCH_3)_3$) is suitable for use as the coupling agent. Alternatively, as stated previously, one or more sulfidosilanes (e.g., TESPD, TESPT) are suitable for such use. As indicated at step 248, the coupling agent is combined with the aqueous ethanol solution to yield a first mixture. Optionally, the uniformity of the first mixture can be improved by employing any one or more lab techniques known to one of ordinary skill in the art (e.g., stirring, mixing, agitating, blending). Thereafter, as indicated at step 250, rubber particles are provided, which are then combined at step 252 with the first mixture to form a second mixture. As indicated at step 254, reactions occur within the second mixture between the rubber particles and the organoreactive functional groups of the coupling agent. During the course of these reactions, many molecules of coupling agent react with each rubber particle. Substantially the entire surface of each of the rubber particles is coated with and bonded to the coupling agent (via the organoreactive functional groups). Thus, due to the presence of the coupling agent's inorganoreactive functional groups (which still are available), substantially the entire surface of each of the rubber particles is changed from organophilic to organoreactive and from hydrophobic to hydrophilic, thereby yielding "inorganoreactive rubber particles" within the second mixture. Optionally, the uniformity of the second mixture can be improved by employing any one or more lab techniques known to one of ordinary skill in the art (e.g., stirring, mixing, agitating, blending). This step, if performed, aids in ensuring that the rubber particles remain suspended within the second mixture, thereby exposing essentially the entire surface of each of the rubber particles to the coupling agent. Also optionally, the second mixture can be heated (e.g., to approximately 85° C.) to improve the reaction between the rubber particles and the organoreactive functional groups of the coupling agent.

Regarding the step of providing rubber particles (shown at 250 in FIG. 5), it is advantageous to provide rubber particles having a diameter of less than, or equal to, approximately five (5) millimeters. The specific surface area, i.e., surface area-to-mass ratio, of a collection of relatively small rubber particles is greater than that of a collection of relatively large rubber particles. Hence, a certain amount (by mass) of relatively small rubber particles (e.g., diameter $\leq 5$ mm) has more surface area and, therefore, are more available in reactions with the coupling agent. Also, for similar reasons, it is advantageous to use rubber particles having relatively irregular shapes, as such particles have more surface area than those having relatively regular shapes. Irregularly shaped and smaller sized rubber particles will bond with more coupling agent per unit mass and thereby absorb more inorganic coating agent per unit mass than larger rubber particles and rubber particles with a lower surface area-to-mass ratio.

Next, as indicated at step 256, a hydraulic substance is provided. Generally, the hydraulic substance includes cement and, optionally, includes silica fume. As indicated at step 258, the hydraulic substance is combined with the second mixture to yield a third mixture. Optionally, the uniformity of the third mixture can be improved by employing any one or more lab techniques known to one of ordinary skill in the art (e.g., stirring, mixing, agitating, blending). As indicated at step 260, reactions occur within the third mixture between the hydraulic substance and the inorganoreactive rubber particles. During the course of these reactions, many molecules of the hydraulic substance react with each inorganoreactive rubber particle, specifically the inorganoreactive functional groups that are derived from the coupling agent. Substantially the entire surface of each of the inorganoreactive rubber particles is coated with and bonded to the hydraulic substance (via the inorganoreactive functional groups). This results in the formation of a hydraulic layer that at least substantially encloses the inorganoreactive rubber particle, yielding a composite particle. Optionally, the third mixture can be heated (e.g., to 85° C.) to improve the reaction therein between the hydraulic substance and the inorganoreactive rubber particles. Also optionally, the composite particles can be at least substantially isolated from the other components of the third mixture by employing one or more lab techniques known to one of ordinary skill in the art (e.g., drying, evaporation, filtration). The composite particles are suitable for addition to a cement (or cementitious) mix and are advantageous in that they do not need an elevated temperature to hydrate in a mix. Hydration at room temperature generally is sufficient.

In those instances in which the hydraulic substance includes silica fume, another advantage can be realized following the incorporation of the composite particles into a cement mix. Specifically, during hydration of the cement mix, the cement present in the hydraulic layer of each of the composite particles yields calcium hydroxide as a byproduct. In order to realize many of the benefits of using silica fume as an admixture in cement (e.g., increased compressive strength, increased bond strength), the silica fume must react with calcium hydroxide. Thus, the calcium hydroxide byproduct—which is released within the hydraulic layer during hydration and, therefore, in close proximity to the silica fume present therein—reacts with the silica fume to increase at least the compressive strength of the composite particle. This, in turn, can further enhance the properties of any resulting rubber-modified concrete that includes these composite particles, which may obviate or diminish any need to add silica fume (or other admixture) directly to the cement mix from which such concrete is derived. Because silica fume currently is significantly more expensive than cement, a cost reduction (and similar performance benefit) can be realized by including a relatively small amount of silica fume in the hydraulic substance (i.e., the substance that eventually forms the hydraulic layer within which the inorganoreactive rubber par-

Having thus described the aforementioned invention, what is claimed is:

1. A rubber-modified cementitious mix comprising:
   cement; and
   composite particles, essentially each of said composite particles having a rubber core enclosed in an inorganic exterior, said rubber core being chemically coupled to said inorganic exterior, said inorganic exterior including silica fume.

2. The rubber-modified cementitious mix of claim 1 wherein said cement is Portland cement.

3. The rubber-modified cementitious mix of claim 1 wherein said rubber core is derived from discarded tires.

4. The rubber-modified cementitious mix of claim 1 wherein said rubber core of essentially each of said composite particles has a diameter that is less than, or equal to, approximately five (5) millimeters.

5. The rubber-modified cementitious mix of claim 1 wherein said inorganic exterior includes a hydraulic substance.

6. The rubber-modified cementitious mix of claim 1 wherein said inorganic exterior of each of said composite particles is chemically coupled to said cement.

7. The rubber-modified cementitious mix of claim 1 further comprising mineral aggregate.

8. The rubber-modified cementitious mix of claim 1 wherein said cement is hydrated.

9. A method for making a rubber-modified cementitious mix, said method comprising the steps of:
   providing rubber particles;
   providing inorganic particles;
   providing a coupling agent;
   reacting said coupling agent with said rubber particles and said inorganic particles to yield composite particles, each of said composite particles having a rubber core enclosed in an inorganic exterior, wherein said rubber core is derived from approximately one of said rubber particles, wherein said inorganic exterior is derived from some of said inorganic particles, and wherein said rubber core is chemically coupled to said inorganic exterior;
   providing a cementitious substance; and
   combining said composite particles and said cementitious substance, yielding said rubber-modified cementitious mix.

10. The method of claim 9 wherein the diameter of essentially each of said rubber particles is less than, or equal to, approximately five (5) millimeters.

11. The method of claim 9 wherein said rubber particles are derived from discarded tires.

12. The method of claim 9 wherein said inorganic particles include a hydraulic substance.

13. The method of claim 9 wherein said inorganic particles include an admixture.

14. The method of claim 9 wherein said inorganic particles include silica fume.

15. The method of claim 9 wherein said coupling agent includes a silane.

16. The method of claim 9 wherein said coupling agent is selected from a group consisting of bis-triethoxysilylpropyldisulfidosilane, bis-triethoxysilylpropyltetrasulfidosilane, and any combination thereof.

17. The method of claim 9 wherein said coupling agent has the formula $(RO)_3Si(CH_2)_3-SX-(CH_2)_3Si(RO)_3$ wherein RO is a hydrolyzable group and x has a range from 2 to 10.

18. The method of claim 9 wherein said coupling agent has the formula $(RO)_3Si(CH_2)_3-SX-(CH_2)_3Si(RO)_3$ wherein RO is a hydrolyzable group and x has a range from 2 to 8.

19. The method of claim 9 wherein said coupling agent has the formula $(RO)_3Si(CH_2)_3-SX-(CH_2)_3Si(RO)_3$ wherein RO is a hydrolyzable group and x has a range from 2 to 6.

20. The method of claim 9 wherein said coupling agent has the formula $(RO)_3Si(CH_2)_3-SX-(CH_2)_3Si(RO)_3$ wherein RO is a hydrolyzable group and x has a range from 2 to 4.

21. A method for making a rubber-modified cementitious mix, said method comprising the steps of:
   providing rubber particles;
   providing inorganic particles;
   providing a first coupling agent;
   reacting said first coupling agent with said rubber particles and said inorganic particles to yield composite particles, each of said composite particles having a rubber core enclosed in an inorganic exterior, wherein said rubber core is derived from approximately one of said rubber particles, wherein said inorganic exterior is derived from some of said inorganic particles, and wherein said rubber core is chemically coupled to said inorganic exterior;
   providing a second coupling agent;
   treating said inorganic exteriors of said composite particles with said second coupling agent, yielding treated composite particles having inorganic exteriors characterized by increased inorganoreactivity;
   providing a cementitious substance;
   combining said treated composite particles and said cementitious substance; and
   reacting said treated composite particles with said cementitious substance, whereby said inorganic exterior of essentially each of said treated composite particles is chemically coupled to said cementitious substance, yielding said rubber-modified cementitious mix.

22. The method of claim 18 wherein the diameter of essentially each of said rubber particles is less than, or equal to, approximately five (5) millimeters.

23. The method of claim 18 wherein said rubber particles are derived from discarded tires.

24. The method of claim 18 wherein said inorganic particles include a hydraulic substance.

25. The method of claim 18 wherein said inorganic particles include an admixture.

26. The method of claim 18 wherein said inorganic particles include silica fume.

27. The method of claim 18 wherein said first coupling agent comprises a silane.

28. The method of claim 18 wherein said first coupling agent is selected from a group consisting of bis-triethoxysilylpropyldisulfidosilane, bis-triethoxysilylpropyltetrasulfidosilane, and any combination thereof.

29. The method of claim 18 wherein said first coupling agent has the formula $(RO)_3Si(CH_2)_3-SX-(CH_2)_3Si(RO)_3$ wherein RO is a hydrolyzable group and x has a range from 2 to 10.

30. The method of claim 18 wherein said second coupling agent includes a silane.

31. The method of claim 27 wherein said second coupling agent is selected from a group consisting of aminoethylaminopropyltrimethoxysilane, glycidoxypropyltrimethoxysilane, and any combination thereof.

32. A method of making composite particles suitable for addition to a cementitious mix, said method comprising the steps of:
   providing an aqueous alcohol solution;
   providing a coupling agent, the molecules of said coupling agent each having both an organoreactive functional group and an inorganoreactive functional group;
   combining said aqueous alcohol solution and said coupling agent to yield a first mixture;
   providing rubber particles;
   combining said first mixture and said rubber particles to yield a second mixture;
   reacting, within said second mixture, said rubber particles and said organoreactive functional groups of said coupling agent, thereby converting said rubber particles to inorganoreactive rubber particles;
   providing a hydraulic substance;
   combining said second mixture and said hydraulic substance to yield a third mixture; and
   reacting, within said third mixture, said inorganoreactive rubber particles and said hydraulic substance to at least substantially enclose said inorganoreactive rubber particles in a hydraulic layer that is derived from said hydraulic substance, thereby converting said inorganoreactive rubber particles to said composite particles suitable for addition to a cementitious mix.

33. The method of claim 32 wherein said rubber particles are derived from discarded tires.

34. The method of claim 32 further including a step for at least substantially isolating said composite particles suitable for addition to a cementitious mix from the other components of said third mixture.

35. The method of claim 32 further including a step for encouraging the uniformity of said first mixture.

36. The method of claim 32 further including a step for encouraging the uniformity of said second mixture.

37. The method of claim 32 further including heating said second mixture to improve said step of reacting, within said second mixture, said rubber particles and said organoreactive functional groups of said coupling agent, thereby converting said rubber particles to inorganoreactive rubber particles.

38. The method of claim 32 further including a step for encouraging the uniformity of said third mixture.

39. The method of claim 32 further including heating said third mixture to improve said step of reacting, within said third mixture, said inorganoreactive rubber particles and said hydraulic substance to at least substantially enclose said inorganoreactive rubber particles in a hydraulic layer that is derived from said hydraulic substance, thereby converting said inorganoreactive rubber particles to said composite particles suitable for addition to a cementitious mix.

40. The method of claim 32 wherein said aqueous alcohol solution includes ethanol.

41. The method of claim 32 wherein said coupling agent includes a silane.

42. The method of claim 32 wherein said coupling agent is selected from a group consisting of aminoethylaminopropyltrimethoxysilane, glycidoxypropyltrimethoxysilane, and any combination thereof.

43. The method of claim 32 wherein said coupling agent is selected from a group consisting of bis-triethoxysilylpropyldisulfidosilane, bis-triethoxysilylpropyltetrasulfidosilane, and any combination thereof.

44. The method of claim 32 wherein the diameter of essentially each of said rubber particles is less than, or equal to, approximately five (5) millimeters.

45. The method of claim 32 wherein the shape of essentially each of said rubber particles is irregular.

46. The method of claim 32 wherein said hydraulic substance includes cement.

47. The method of claim 46 wherein said hydraulic substance includes silica fume.

* * * * *